United States Patent [19]

Kosmowski

[11] 4,443,141

[45] Apr. 17, 1984

[54] PINLESS PRESSURE FOOT FOR MACHINE TOOL

[75] Inventor: Wojciech B. Kosmowski, San Juan Capistrano, Calif.

[73] Assignee: Cooper Industries, Houston, Tex.

[21] Appl. No.: 351,213

[22] Filed: Feb. 22, 1982

[51] Int. Cl.³ .......................... B23C 3/00; B23C 9/00; B27C 5/06

[52] U.S. Cl. .................................. 409/163; 409/178; 409/189; 409/190; 144/134 A

[58] Field of Search ................. 409/80, 137, 175, 178, 409/181, 182, 189, 190, 191, 225, 197, 163; 279/1 L; 144/134 R, 134 A, 134 B, 136 R

[56] References Cited

U.S. PATENT DOCUMENTS 4,158,987 6/1979 Smith ..................................... 409/80

Primary Examiner—Francis S. Husar
Assistant Examiner—Jorji M. Griffin
Attorney, Agent, or Firm—Spensley, Horn, Jubas & Lubitz

[57] ABSTRACT

A novel arrangement of pressure foot and drive therefor for providing a frictional clamping arrangement for holding a workpiece being cut by a router so as to prevent movement of the cutout portion of the workpiece in the last increment of the cut. The pinless pressure foot includes a ring-shaped friction member supported by a slide member adjacent one end of a spindle, circumscribing a cutting tool, for engaging the surface of the workpiece. A plurality of flexure members extend around the spindle, first ends of the flexure members being connected to the slide member. The drive is positioned adjacent the other end of the spindle and is movable axially relative thereto, the drive being connected to the other ends of the flexure members for moving the friction member into contact with the workpiece, the flexure members transmitting the axial force of the drive to the friction member to force the workpiece against a worktable for preventing movement thereof relative to the worktable during completion of the cut. The flexure members permit lateral movement of the friction member relative to the cutting tool during completion of the cut. A locking ring selectively prevents lateral movement of the friction member relative to the cutting tool.

14 Claims, 8 Drawing Figures

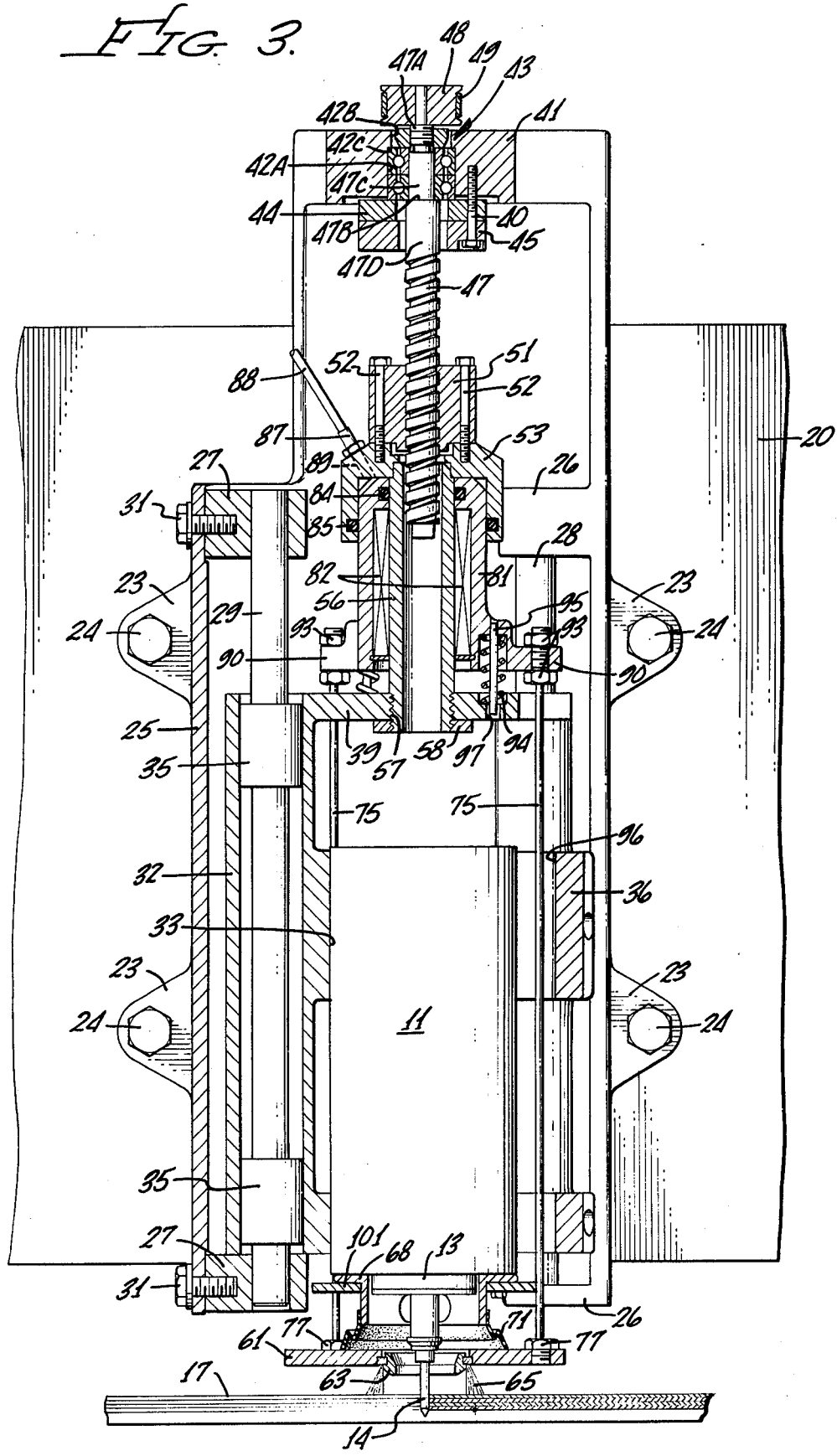

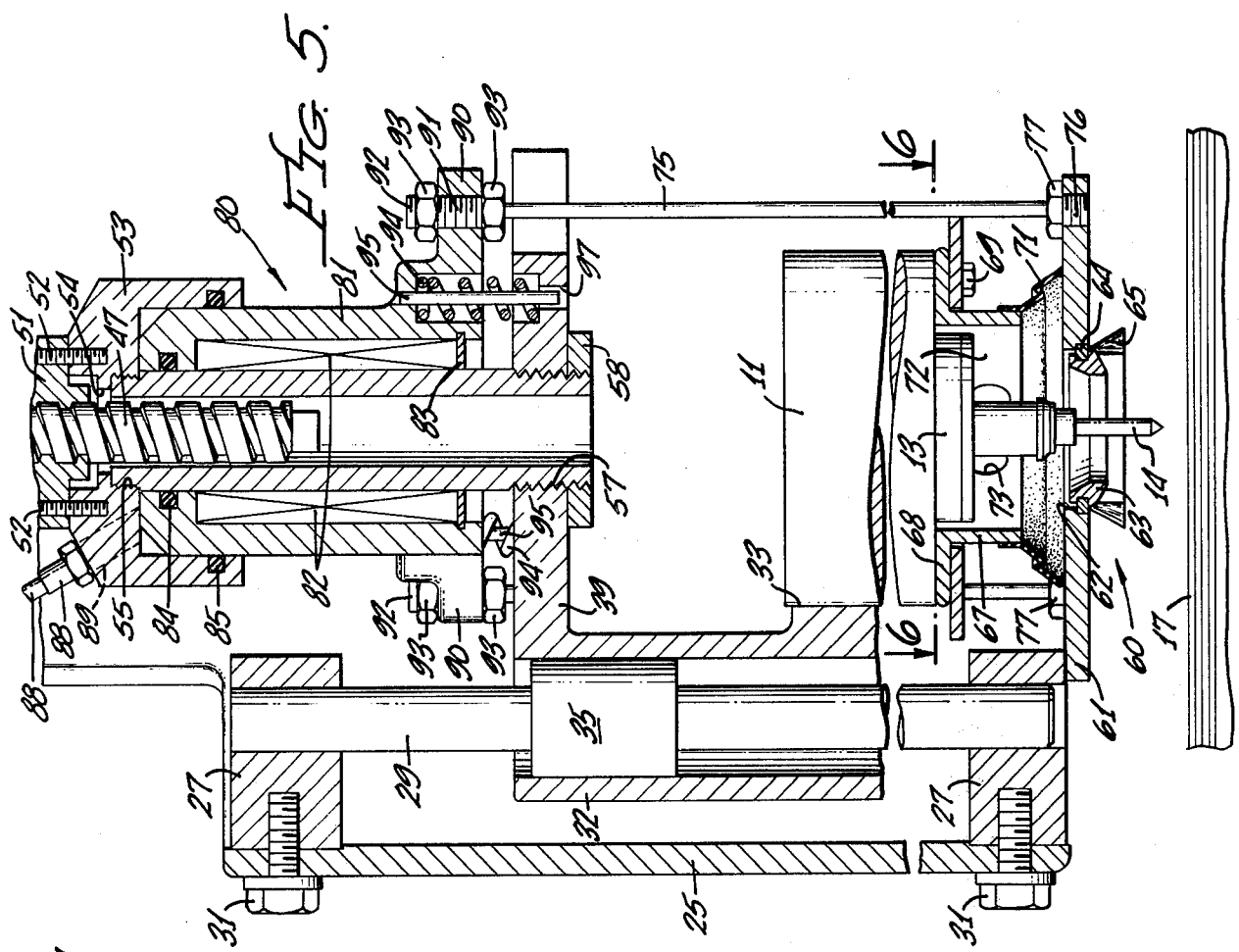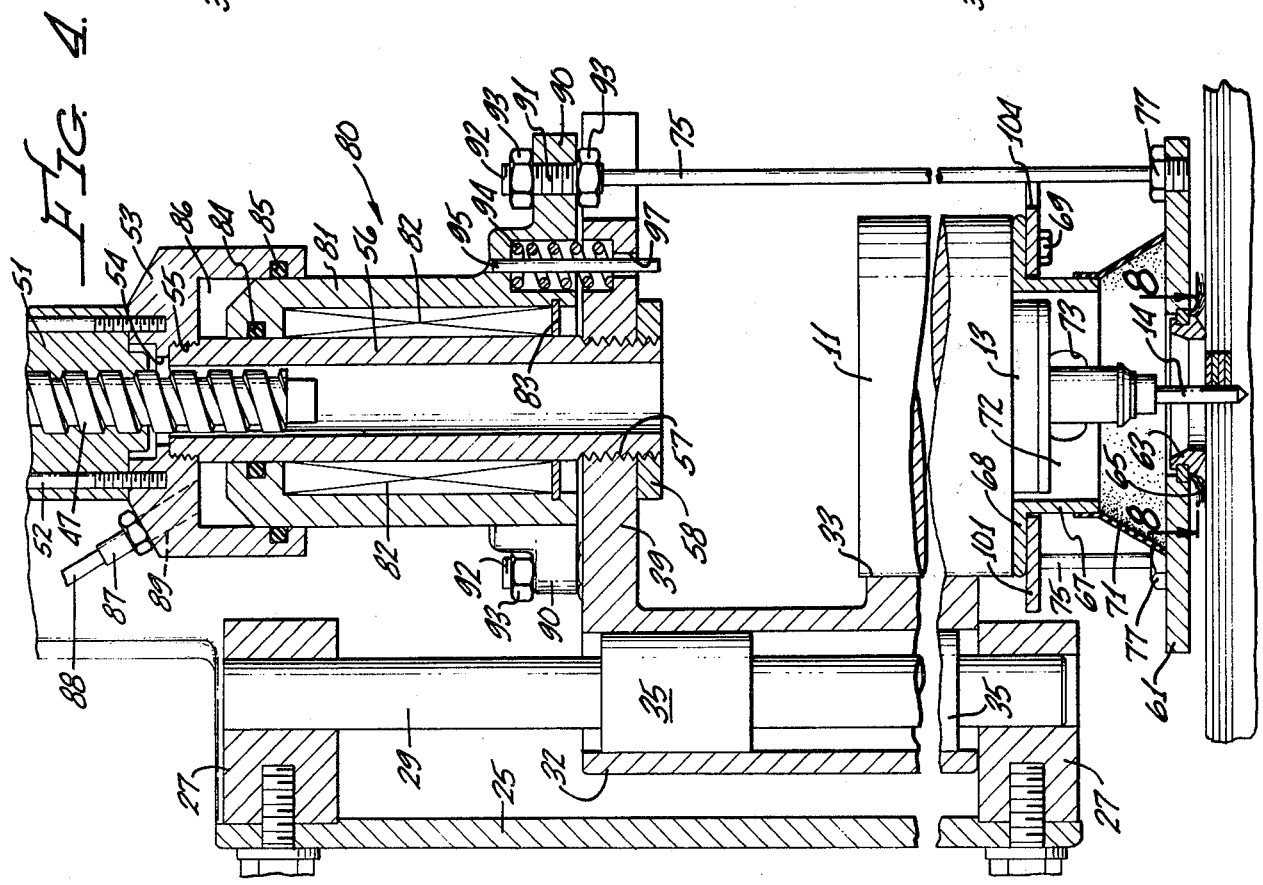

PINLESS PRESSURE FOOT FOR MACHINE TOOL

BACKGROUND OF THE INVENTION

1. Field of the Invention

The present invention relates to a pinless pressure foot for a machine tool, such as a router, and, more particularly, to a simpler, less costly, easier to maintain, and otherwise more efficient pinless pressure foot for a machine tool.

2. Description of the Prior Art

In the operation of automatic routing machines, it is conventional to position a stack of workpieces, such as those used in producing printed circuit boards, on a worktable and to hold them in place by tooling pins which extend through openings in the workpieces. For accuracy, there is a close fit between the tooling pins and the workpieces at the openings so that there is no clearance around the pins to permit relative lateral movement. Because of this relatively tight fit, the process of inserting the tooling pins into the stacked workpieces is laborious and time consuming.

It has also been necessary to provide these tooling pins in the portions of the workpieces which are cut out, as well as the portions outside of the cut line, because otherwise, the cutout portions will be moved laterally during the cutting operation and an accurate cut will not be produced. This lateral movement of the cutout portion will occur during the last increment of the cut, arising from the lateral force produced by the router bit as the worktable is moved relative to the spindle. Prior to that time, the portion of the workpiece to be cutout will be joined to the portion outside of the cut line by sufficient material to prevent relative movement. When the cut is nearly complete, however, the connecting portion becomes very small and lacks the strength to withstand the lateral force of the router. Thus, unless it has been held by tooling pins or other auxiliary clamping members, the cutout portion will break off or move as the connecting portion is cut through and its edge will not be accurately formed.

The necessity for using tooling pins in the cutout portions has substantially increased the production time for the machine. The drilling of the various holes for the tooling pins and the close tolerances required take a substantial amount of the operator's time in preparing the workpieces for routing and installing them on the worktable. After the routing operation is complete, additional time is expended in prying the cutout parts off of the tooling pins that hold them. Consequently, the production rate of a routing machine has been slowed and expenses have been increased because of the need for pinning the portions of the workpieces to be cut out.

In order to eliminate the necessity for tooling pins in the cutout portions, it has been proposed to provide means which will hold the cutout portions of the workpieces without the use of such tooling pins or other auxiliary clamps. This materially improves the efficiency of the routing machine and production rates are increased. The means for holding the cutout portions, referred to as a pinless pressure foot, consists of a workpiece engagable means circumscribing the cutting tool of the routing machine and being movable axially relative to the spindle for selectively engaging the surface of the portion of the workpiece, forcing the portion of the workpiece against the worktable for preventing movement thereof relative to the worktable during completion of the cut. Prior to completion of the cut, the workpiece engagable means moves with the spindle, above the workpiece. When the cutting tool has reached a predetermined point prior to completion of the cut, a drive mechanism moves the workpiece engagable means into contact with the workpiece and the workpiece engagable means remains stationary as the cutting tool moves laterally to complete the cut. When the cut has been completed, the workpiece engagable means is released and returned to its centered position relative to the spindle.

In prior art pinless pressure feet, there has been provided a housing around the spindle and the router bit, at the lower portion of which is a slide member which is movable laterally relative to the housing. This movement has ordinarily been prevented by a locking pin arrangement, including multiple locking pins which may be selectively released to release the slide member. Carried by the slide member is a sleeve that circumscribes the router bit and includes an annular member that is held against the surface of the workpiece during routing. This is accomplished by a downward force on the housing. The annular member may be a brush arrangement which produces a relatively low friction drag. Its downward force on the workpiece holds the workpiece flat against the worktable as the worktable moves relative to the spindle in producing the cut in the workpiece, compensating for warpage of the workpiece. This annular member also forms an enclosed chamber to which a vacuum line may be connected to remove the debris generated during the routing operation.

Also included on the slide member is an element having a relatively high coefficient of friction, such as an O-ring, which is normally spaced above the surface of the workpiece. However, when the cut is nearly completed, an increased force is applied to the housing, urging it and the slide member downwardly relative to the spindle, causing the O-ring to be brought into engagement with the surface of the workpiece. The engagement of the O-ring with the workpiece is around the router bit so that the O-ring engages the portion of the workpiece within the cut line as well as outside of the cut. Simultaneously with the forcing of the housing downwardly, the locking pin arrangement is withdrawn so that the slide member can move laterally relative to the housing. Lateral movement of the slide member relative to the housing is permitted either by a ball bearing arrangement, an air bearing or another low friction arrangement between the slide member and the housing. Accordingly, as the worktable proceeds to move laterally relative to the router for completing the cut, the slide member remains stationary relative to the worktable and, through the O-ring, holds the cutout portion of the workpiece motionless relative to the worktable. As this takes place, the slide member moves laterally relative to the spindle.

Upon completion of the routing operation, the head of the machine is raised, lifting the housing and associated elements away from the workpiece, with the cutout portion then being free for removal from the machine. Typically, centering springs return the slide member to its original position and the locking pin arrangement is activated preparatory to the next cutting operation.

While such a pinless pressure foot materially improves the efficiency of routing machines, several problems remain. The housing and the slide member and all of the mechanism for activating same are all typically located in the crowded area surrounding the cutting tool which creates a number of problems. Because this is the area where the tool and the work is, the mechanism interferes with the work area of the operator and is subject to contamination from the routing operation. By being located in the work area, the pinless pressure foot is subject to damage, increasing maintenance costs. The mechanism is also less accessible for repair.

The force for moving the slide member into contact with the workpiece is typically generated by multiple cylinder/piston arrangements surrounding the spindle. If these cylinders/pistons are not exactly balanced, binding of the movable housing may occur. Similar problems occur with regard to the locking pin arrangement which typically includes multiple cylinders/pistons. Because of the multiple drive means for the locking pin arrangement and the drive means, the mechanism is complex, expensive, and time consuming to maintain.

The method for permitting lateral movement of the slide member relative to the housing has always included a bearing located within the vicinity of the workpiece, where it is subject to contamination and damage. Separate means must be provided for centering of the slide member relative to the housing, adding to the complexity and cost of the system.

SUMMARY OF THE INVENTION

The present invention overcomes the difficulties of the prior art by providing a novel means for holding the cutout portions of the workpieces with a pinless pressure foot. With the present invention, the slide member is located in a position circumscribing the cutting tool and incorporates an annular ring for selectively engaging the workpiece. On the other hand, the drive means for the pressure foot is located remote from the work area and includes a single piston/cylinder arrangement. The locking device also includes a single cylinder/piston arrangement. The combination of these two arrangements eliminates binding of the force applying means and moves the primary drive element away from the work area and away from potential contamination. By locating significantly fewer portions of the mechanism in the area where the tool is, there is less damage thereto and a better work area for the operator. The resulting tool has less parts, is less expensive and is easier to maintain. The mechanism is much simpler and much more accessible.

The present invention eliminates the conventional types of bearing arrangements used heretofore and the spring centering devices. The slide member is supported by a plurality of elongate, flexible, noncompressible rods which interconnect the pressure foot located at one end of the spindle and the drive means located at the other end of the spindle so as to transmit the axial force of the drive means to the slide member while permitting lateral movement of the slide member relative to the spindle. The rods permit self-centering of the slide member without separate centering springs and again function to substantially simplify the mechanism in the area of the worktable.

Briefly, in combination with a machine tool having a spindle, a cutting tool connected to one end of the spindle to be rotated thereby, and a worktable for supporting a workpiece for being cut by the cutting tool, the worktable and the spindle being relatively laterally movable for producing a cut in the workpiece along a predetermined line, which cut, upon completion thereof, will produce a cutout part from the portion of the workpiece within the line, the cutting tool exerting a lateral force on the workpiece such that when the cutting tool has reached a predetermined point on the line and prior to completion of the cut, the cutting tool will cause lateral motion of the portion of the workpiece relative to the worktable unless the portion is restrained, there is disclosed a device for selectively restraining the portion of the workpiece comprising a slide member circumscribing the cutting tool and being movable axially relative to one end of the spindle for selectively engaging the surface of the portion of the workpiece, a plurality of elongate, flexible, noncompressible rods extending around the spindle, first ends of the rods being connected to the slide member, a drive means positioned adjacent the other end of the spindle and being movable axially relative thereto, the drive means being connected to the other ends of the rods for moving the slide member into contact with the portion of the workpiece to force same against the worktable for preventing movement thereof relative to the worktable during completion of the cut, the flexible rods permitting lateral movement of the slide member relative to the cutting tool during completion of the cut, and a locking ring selectively engaging the flexible rods for preventing lateral movement thereof and the slide member relative to the cutting tool prior to the completion of the cut.

OBJECTS, FEATURES, AND ADVANTAGES

It is therefore the object of the present invention to solve the problems encountered heretofore with the use of a pressure foot for a machine tool such as a router. It is a feature of the present invention to solve these problems by the provision of a novel design of pressure foot, drive means therefore and locking means therefore. An advantage to be derived is a much simpler mechanism. Another advantage is a pressure foot which is less expensive. A further advantage is a pressure foot which is easier to maintain. Another advantage is a pressure foot in which most of the mechanism is located away from the work area. Still another advantage is a pressure foot which eliminates binding of moving parts. Another advantage is a pressure foot which minimizes contamination of moving parts. Still another advantage is a pressure foot which eliminates conventional ball bearings or air bearings between a slide member and a housing.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 3 is a sectional view taken along the line 3—3 in FIG. 2;

FIGS. 4 and 5 are enlarged, partial sectional views like FIG. 3 showing different positions of the cutting tool and pressure foot;

DESCRIPTION OF THE PREFERRED EMBODIMENT

Figure 1:
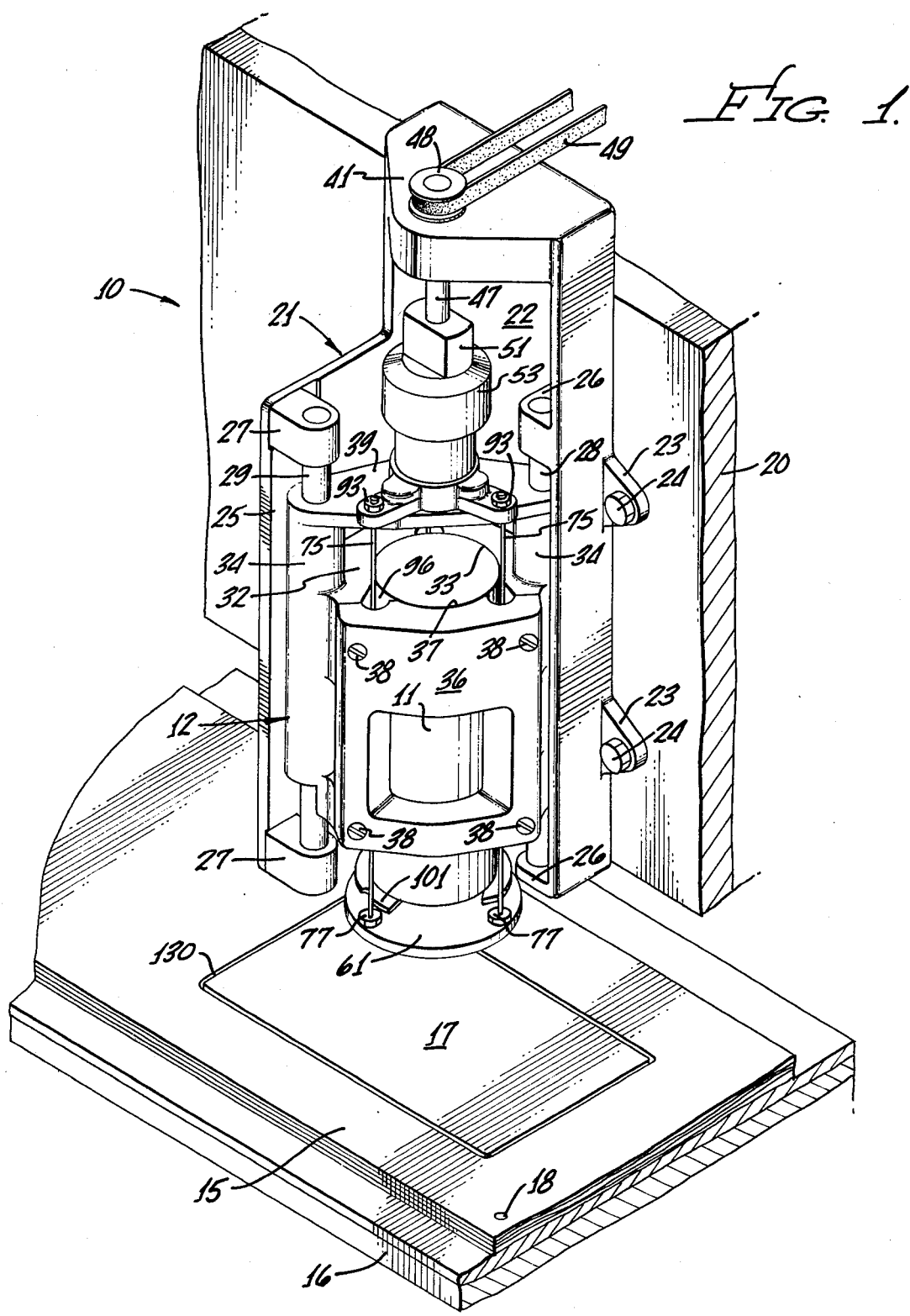
FIG. 1 is a perspective view of a portion of a routing machine incorporating a pressure foot constructed in accordance with the teachings of the present invention.
Figure 2:
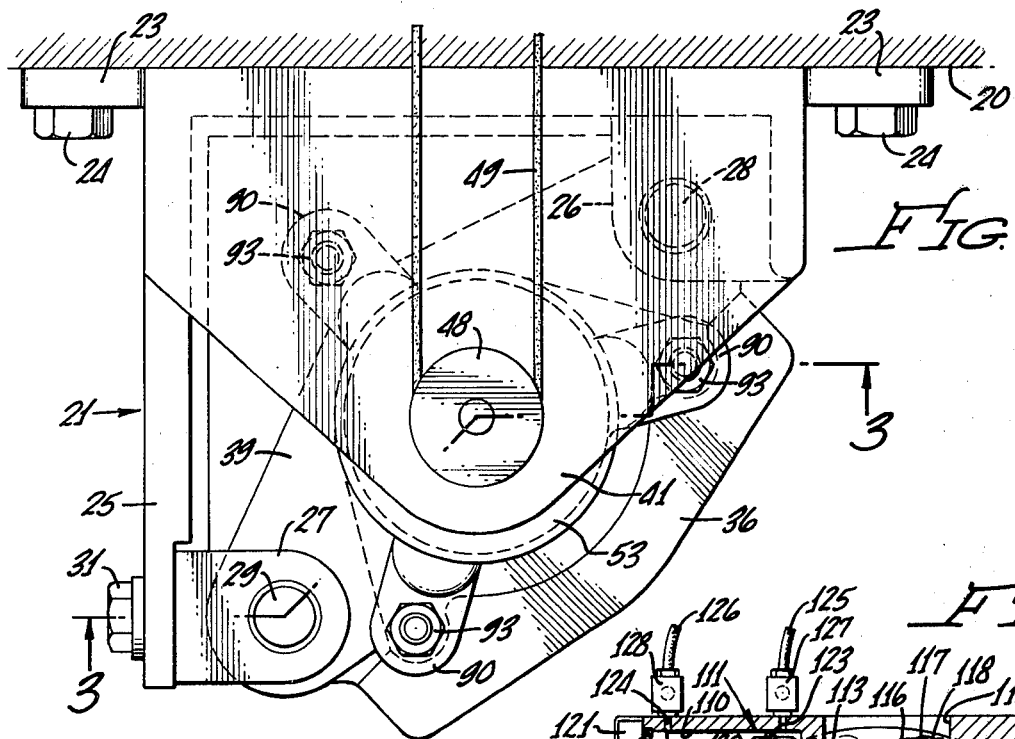
FIG. 2 is a top plan view thereof.

The present invention relates to a pressure foot for a machine tool, such as a router, generally designated 10, portions of which are shown in FIGS. 1–3. Routing machine 10 includes a spindle 11 mounted within a spindle guide 12. Spindle 11 may be a conventional spindle having a chuck 13 at one end thereof which retains a router bit 14. The latter element is used in cutting a workpiece or a stack of workpieces 15 positioned on a worktable 16. Intermediate members, not relevant to the present invention, may be positioned between worktable 16 and workpieces 15. In any event, worktable 16 supports workpieces 15 and is movable laterally in a horizontal plane. In this manner, router bit 14 is able to cut out finished parts, such as part 17.

The stack of workpieces 15 is held on worktable 16 by the use of only two tooling pins in opposite ends of workpieces 15, such as tooling pin 18 shown in FIG. 1. These tooling pins 18 may be located in areas remote from where parts 17 are cut out. The cutout parts 17 are not held by tooling pins 18 and so are unrestrained upon being severed from workpieces 15. In conventional router use, it would be necessary to include additional tooling pins at the locations of parts 17 to assure accuracy of the cut by preventing part movement at the last portion of the cut. These extra tooling pins are eliminated by the present invention.

Spindle guide 12 and spindle 11 are mounted on an overhead slide 20 which is preferably movable laterally in a horizontal plane, as well known to those skilled in the art. According to a preferred routing machine, slide 20 and worktable 16 are movable laterally in mutually orthogonal directions to provide router bit 14 within the necessary two degrees of freedom to provide the desired cut. Vertical movement of spindle 11 results from the interconnection between spindle guide 12 and a frame, generally designated 21, connected to slide 20.

More specifically, frame 21 is a generally L-shaped member, one side 22 of which includes a plurality of flanges 23 through which bolts 24 pass, bolts 24 extending into mating holes in slide 20. Side 22 of frame 21, as well as the other side 25 thereof, incorporate flanges 26 and 27, respectively, at the upper and lower ends thereof, which support the opposite ends of a pair of spindle guide rails 28 and 29, respectively. Flanges 26 may be made integral with side 22 of frame 21 whereas flanges 27 may be connectable to side 25 of frame 21 by means of bolts 31, as shown mostly clearly FIGS. 2 and 3. By bolting flanges 27 to side 25 of frame 21, machining tolerances are absorbed, eliminating complex machining of the parts of spindle guide 12.

Rails 28 and 29 support spindle guide 12 for vertical movement so that router bit 14 may be brought into contact with workpieces 15. More specifically, spindle guide 12 includes a first, generally C-shaped housing member 32 having a cylindrical inner surface 33 for receipt of a portion of the outer surface of spindle 11. The opposite sides of housing member 32 terminate in elongate, hollow cylindrical members 34 through which rails 28 and 29 extend. Cylindrical members 34 have bearings 35, shown in FIG. 3, pressed thereinto which permit vertical movement of members 34 relative to rails 28 and 29. A second housing member 36 having a cylindrical inner surface 37 is connected to housing member 32 by means of bolts 38. As clearly seen in FIG. 1, connection of housing member 36 to housing member 32 by means of bolts 38 sandwiches spindle 11 therebetween and securely connects spindle 11 between these housing members of spindle guide 12. This permits axial movement of spindle 11 with members 34 relative to rails 28 and 29. An additional horizontal support plate 39 extends between the upper ends of members 34 with rails 28 and 29 extending through the opposite ends thereof, for reasons which will appear more fully hereinafter.

The manner in which spindle guide 12 moves vertically relative to rails 28 and 29 can be seen most clearly from an examination of FIGS. 1-4. Frame 21 includes an upper horizontal flange 41 having a bore 42A extending therethrough in which are mounted a pair of ball bearings 43. The outer race of the upper bearing 43 engages a shoulder 42C formed between bore 42A and a reduced diameter bore 42B above bore 42A. Positioned directly below bearings 43 is a bearing retainer 44, below which is a mechanical stop 45. Bearing retainer 44 engages the outer race of the lower bearing 43 and urges the outer races against shoulder 42C. Bearing retainer 44 and stop 45 are secured to flange 41 by means of a plurality of screws 40. Stop 45 functions as a mechanical stop for a nut 51 to be described more fully hereinafter.

Positioned above bearings 43 is a locknut 46 which engages a threaded section 47A of a lead screw 47. Locknut 46 engages the inner race of the upper bearing 43 and urges the inner races against a shoulder 47B formed between a section 47C of lead screw 47 which extends through bearings 43 and an increased diameter section 47D below section 47C. The above-described arrangement supports lead screw 47 for free rotation while restricting axial movement. The upper end of lead screw 47 is connected to a pulley 48 which is engaged by a timing belt 49. In this manner, belt 49 drives pulley 48 and rotates lead screw 47 relative to flange 41.

The main body of lead screw 47 incorporates threads which engage the internal threads of a lead screw nut 51. Nut 51 is connected, by means of bolts 52, to the outer surface of the closed end of a cylinder 53. The closed end of cylinder 53 has an internal bore 54 and an increased diameter internally threaded bore 55 at the internal end thereof for receipt of the external threads at one end of a sleeve 56. Sleeve 56 is tightened within bore 55 until it engages the shoulder defined between bores 54 and 55. The inside diameter of sleeve 56 is greater than the outside diameter of lead screw 47 so that lead screw 47 may extend therethrough, as shown most clearly in FIG. 5. The other end of sleeve 56 is externally threaded and engages an internally threaded bore 57 in support plate 39. A nut 58 may be used to tighten sleeve 56 against plate 39.

With the construction just described, it will be apparent to those skilled in the art that rotation of lead screw 47 causes axial movement of nut 51 relative thereto. Nut 51, cylinder 53, sleeve 56, and support plate 39 are all rigidly interconnected whereby this vertical movment of nut 51 is transmitted by support plate 39 to the entire spindle guide 12. Thus, rotation of lead screw 47 permits axial movment of spindle 11 so as to bring router bit 14 into contact with workpieces 15.

According to the present invention, a pressure foot, generally designated 60, is located at the lower end of spindle 11. Pressure foot 60 includes a disk-shaped plate or slide member 61 which is positioned generally horizontally above workpieces 15, circumscribing router bit 14. Slide member 61 has an internal opening through which router bit 14 passes. Secured in opening 62 is a ring shaped nose 63 of a hard material, such as rubber or aluminum, which is secured to plate 61 by a retaining ring 64. It is nose 63 which contacts the upper workpiece 15 and provides the clamping arrangement. Retainer ring 64 also supports a plurality of brushes 65 which circumscribe router bit 14 for reasons which will appear more fully hereinafter.

With reference to FIGS. 3–7, a sleeve 67 surrounds chuck 13 and has a radially outwardly extended flange 68 which is secured to the bottom surface of spindle 11 by means of a plurality of shoulder bolts 69. One end of a flexible, sleeve-like boot 71 is connected to the outside surface at the lower end of sleeve 67. The other end of boot 71 is connected to the upper surface of slide member 61. Thus, sleeve 67 and boot 71, in combination with opening 62 and brushes 65, form a chamber 72 surrounding router bit 14. By connecting a vacuum line to this chamber by means of an opening 73 in sleeve 67, the debris generated during a routing operation can be removed from the work area.

Slide member 61 is supported by a plurality of elongate, flexible, noncompressible rods or flexure members 75 which extend around spindle 11, coaxial therewith, rods 75 having first increased diameter, externally threaded, lower ends 76 which extend into internally threaded holes in slide member 61. After ends 76 of rods 75 are inserted into the holes in slide member 61, nuts 77 engaging ends 76 are tightened against the upper surface of slide member 61. The upper ends of rods 75 are connected to a drive means, generally designated 80, positioned above the upper end of spindle 11 and above support plate 39. Drive means 80 includes cylinder 53 and an elongate, sleeve-like piston 81. Piston 81 surrounds sleeve 56 and supports an internal bearing 82 which supports piston 81 for slidable movment relative to sleeve 56. Bearing 82 is held in place within piston 81 by means of a bearing retainer 83. The upper end of piston 81 has an internal diameter which is approximately equal to the outside diameter of sleeve 56. An O-ring 84 positioned with an internal groove in this end piston 81 forms a fluid-tight seal between the internal surface of piston 81 and sleeve 56. The outside diameter of piston 81 is approximately equal to the inside diameter of cylinder 53. An O-ring 85 positioned in an internal groove in cylinder 53 forms a fluid-tight seal between cylinder 53 and piston 81. Thus, a chamber 86 is formed between cylinder 53 and piston 81 into which pressure may be introduced by means of a fitting 87 connected between a pressure line 88 and a passageway 89 extending through cylinder 53 and terminating in chamber 86.

The lower end of piston 81 incorporates a plurality of radially outwardly extending flanges 90, each of which has a bore 91 extending axially therethrough. Rods 75 have increased diameter, externally threaded, upper ends 92 which extend through bores 91. A pair of nuts 93 engage each end 92 of rods 75, one above and one below flanges 90, so as to permit adjustment of the axial position of rods 75 relative to flanges 90. This adjustment permits the horizontal levelling of slide member 61.

As seen in FIGS. 3–5, a spring 94 is positioned between support plate 39 and each flange 90. Opposed bores in the upper surface of plate 39 and the lower surface of flanges 90 receive the opposite ends of springs 94. A pin 95 is pressed into a hole in each flange 90, pins 95 extending through springs 94 and through coaxial holes 97 in plates 39. Pins 95 prevent rotation of piston 81 relative to sleeve 56.

With such a construction, it will be apparent that piston 81 is axially movable relative to sleeve 56. Springs 94 normally bias piston 81 in an upward position, shown in FIGS. 3 and 5, springs 94 moving piston 81 vertically upwardly relative to sleeve 56 until the upper surface of piston 81 engages the internal lower surface of cylinder 53. In this position, piston 81, rods 75 and slide member 61 move axially with the remainder of spindle guide 12. On the other hand, application of fluid pressure to chamber 86 via pressure line 88, fitting 87 and passageway 89 drives piston 81 vertically downwardly relative to cylinder 53 to the position shown in FIG. 4, compressing springs 94. This operation will be described more fully hereinafter. It remains only to be mentioned at this time that as shown in FIG. 1, housing members 32 and 36 are provided with channels 96 through which rods 75 extend as they pass from drive means 80 to slide member 61.

Rods 75 are relatively flexible members which permit lateral movement of slide member 61 relative to router bit 14. Furthermore, rods 75 function to center slide member 61 relative to router bit 14. Thus, if slide member 61 is moved laterally relative to router bit 14 and then released, slide member 61 automatically returns to its centered position, with opening 62 coaxial with router bit 14. Accordingly, and as will be described more fully hereinafter, if nose 63 is forced into contact with workpieces 15, router bit 14 may continue to move laterally while slide member 61 remains stationary. Upon elevation of slide member 61 and/or router bit 14, rods 75 will return slide member 61 to its centered position.

During normal routing, brushes 65 are held against the surface of workpieces 15, producing a relatively low friction drag. This low friction force on workpieces 15 holds workpieces 15 flat against worktable 16 as worktable 16 moves relative to spindle 11 in producing the cut in workpieces 15. This low friction contact also seals chamber 72 so that the debris from the routing operation can be withdrawn through opening 73. Accordingly, it is necessary, during the normal routing operation, to maintain slide member 61 in its centered position and to prevent flexure of rods 75. According to the present invention, this is achieved by means of a single locking ring 101.

Locking ring 101 is a thin member which has an internal diameter which is slightly greater than the outside diameter of sleeve 67 and surrounds same, coplanar with and directly below flange 68. Ring 101 has a pair of slots 102 therein through which shoulder bolts 69 extend, as seen most clearly in FIGS. 6 and 7. Thus, while shoulder bolts 69 securely clamp flange 68 of sleeve 67 against the bottom of spindle 11, the shoulder 70 of bolt 69 provide a space between the heads of bolts 69 and flange 68, in which space locking ring 101 is positioned. Thus, locking ring 101 is freely rotatable around sleeve 67 about an axis which is coaxial to that of spindle 11.

The outside diameter of ring 101 is selected so that the outer surface 103 of ring 101 engages each of rods 75. In this position, flexure of rods 75 is prohibited. On the other hand, surface 103 of locking ring 101 has a pair of cam slots 104 at 120° intervals therearound and ring 101, for manufacturing reasons, is not a complete ring and terminates, at one end thereof, at a cam surface 105. As will be explained more fully hereinafter, ring 101 is rotatable from a position shown in solid lines in FIG. 6 to a position shown in phantom in FIG. 6 wherein slots 104 are aligned with two of rods 75 and surface 105 at the end of ring 101 is moved past the remaining rod 75. As should be evident, in this position of locking ring 101, rods 75 are free to flex laterally to permit movment of slide member 61.

Operation of locking ring 101 is under control of a cylinder/piston arrangement mounted within housing member 32. More specifically, and with reference to FIG. 6, housing member 32 has a cylinder 110 therein, which extends horizontally to worktable 16, a piston 111 being positioned within cylinder 110. Piston 111 includes a piston shaft 112 which extends through an opening 113 at one end of cylinder 110. An O-ring 114 positioned within a groove in the internal surface of opening 113 provides a fluid-tight seal between opening 113 and shaft 112. This end of shaft 112 extends into a slot 115 in the external surface of housing member 32 and terminates in a connecting member 116 which is connected by means of a pin 117 to a tab 118 made integral with surface 103 of locking ring 101. It should therefore be apparant that axial movement of shaft 112 rotates locking ring 101 around sleeve 67.

The other end of shaft 112 terminates in a piston head 119 having an O-ring 120 positioned in a groove in the external surface thereof so as to provide a fluidtight seal between head 119 and cylinder 110. The other end of cylinder 110 is sealed by a bolt 121 and an O-ring 122 between the head of bolt 121 and cylinder 110 provides a fluidtight seal therebetween.

A pair of passageways 123 and 124 extend through housing member 32 to provide fluid communication to the opposite ends of cylinder 110. Passageways 123 and 24 are connected to pressure lines 125 and 126, respectively, by means of fittings 127 and 128, respectively. Thus, the application of pressure to one or the other of lines 125 or 126 functions to drive piston 111 relative to cylinder 110 to rotate ring 101 as described hereinbefore.

Figure 6:
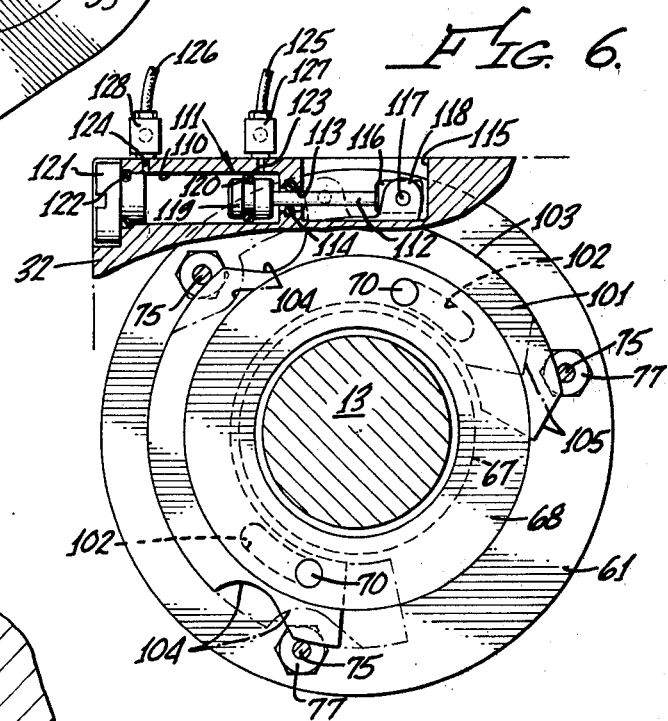
FIG. 6 is an enlarged sectional view taken along the line 6—6 in FIG. 5.
Figure 7:
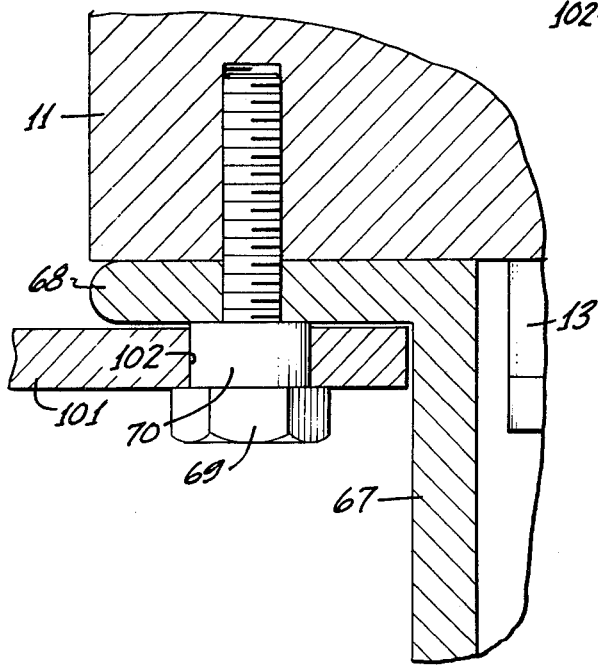
FIG. 7 is an enlarged sectional view taken along the line 7—7 in FIG. 6.

In operation, pressure is normally applied to pressure line 126 to drive piston 111 to the position shown in solid lines in FIG. 6 whereby surface 103 of locking ring 101 engages rods 75 to prevent flexure thereof. Pressure is normally not applied to line 88 whereby springs 94 maintain piston 81 in its elevated position relative to support plate 39, as shown in FIG. 5. FIG. 5 also shows the elevated position of spindle 11. Actually, spindle 11 and spindle guide 12 may be elevated significantly above the position shown in FIG. 5 to enable workpieces 15 to be positioned on worktable 16.

After workpieces 15 are secured on worktable 16 and held in position by suitable tooling pins 18, belt 49 is activated by an external drive device (not shown) to rotate pulley 48 and lead screw 47. Lead screw 47 drives nut 51 and spindle guide 12 downwardly, thereby lowering spindle 11. Router bit 14 then enters the stacked workpieces 15 to initiate the cut. As this occurs, brushes 65 engage the uppermost workpiece 15 and slide member 61 of pressure foot 60 moves no further. This is the position of routing machine 10 shown in FIG. 3. Brushes 65 are arranged so that they exert a low level force against workpieces 15, holding them flat against worktable 16.

Figure 8:
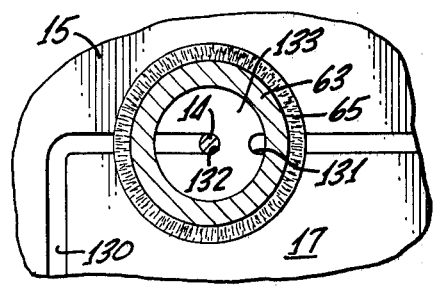
FIG. 8 is a sectional view taken along the line 8—8 in FIG. 4 illustrating the path of the router bit in making the cut.

Slide 20 and/or table 16 are then moved laterally so that router bit 14 produces a cut 130 in workpieces 15 in a predetermined pattern, such as that shown in FIGS. 1 and 8. Brushes 65 slide easily over the surface of the uppermost workpiece 15 as this occurs. Workpieces 15 are held laterally fixed on worktable 16 by tooling pins 18 as the cut is made. Cut 130 is made around the periphery of the printed circuit board 17 being cut out, from a point 131 where the cut was initiated to a point 132 where the cut is almost complete. In this position, there is some remaining material 133 between points 131 and 132 which is just sufficient to withstand the lateral force of router bit 14 and hold the cut out portion rigidly fixed relative to the remainder of workpieces 15. Typically, around one-quarter inch of material remains in this uncut portion. Upon any appreciable additional cutting, however, such as back to position 131, there would be insufficient material interconnecting cutout part 17 to the remainder of workpiece 15 to prevent relative movement of cutout part 17.

At this time, and without stopping machine 10, pressure is simultaneously applied to pressure line 88 and pressure line 125. Application of pressure to line 125 rotates locking ring 101 from the position shown in solid lines in FIG. 6 to the position shown in phantom in FIG. 6. This releases rods 75, permitting flexure thereof. Application of pressure to line 88 drives piston 81 from the position shown in FIG. 3 to the position shown in FIG. 4 where nose 63 is forced against workpieces 15. The pressure in cylinder 53 is sufficient to cause nose 63 to exert a substantial force against workpieces 15. Nose 63, by circumscribing router bit 14, engages both the cutout printed circuit board portion 17 within cut line 130 and the outer portions of workpieces 15 outside cut line 130. By being pressed tightly against worktable 16 by nose 63, portion 17 of workpieces 15 within cut line 130 becomes clamped and held against lateral movement relative to worktable 16.

As worktable 16 and/or slide 20 continue to move to complete the cut, router bit 14 moves relative to workpieces 15. Rods 75 flex to permit slide member 61 to remain fixed relative to workpieces 15 during this final movement of router bit 14. During this time, therefore, slide member 61 moves freely relative to spindle 11. The continued clamping force provided by cylinder 53 assures that cutout part 17 makes no movement relative to the outer part of workpieces 15 as the final increment of material 133 is severed and the cut is completed. Therefore, even though there are no tooling pins holding the cutout printed circuit board 17, it does not move relative to worktable 16 at any time during the routing operating and a perfectly smooth and accurate cut is obtained all the way around its periphery.

After cut 130 is completed, the pressure is removed from cylinder 53, permitting springs 94 to return piston 81 to its upward position shown in FIGS. 3 and 5. Rods 75 automatically recenter slide member 61. At this time, pressure is applied to pressure line 126 to move piston 111 to return locking ring 101 to the position shown in solid lines in FIG. 6. Slots 104 and surface 105 engage rods 75, if necessary, to lead rods 75 back onto outer surface 103 of locking ring 101. At this time, or simultaneously, lead screw 47 may be activated to withdraw routing bit 14 from workpieces 15 to move routing bit 14 to another location on workpieces 15 to repeat this operation or to permit workpieces 15 and cutout portions 17 to be removed from worktable 16.

It can therefore be seen that the present invention overcomes the difficulties of the prior art by providing a novel means for holding the cutout portions 17 of workpieces 15 with a pinless pressure foot 60. With the present invention, slide member 61 is located in a position circumscribing router bit 14 and incorporates an annular ring 63 for selectively engaging workpieces 15. On the other hand, drive means 80 for pressure foot 60 is located remote from the work area and includes a single piston/cylinder arrangement. The locking device including locking ring 101 also includes a single cylinder/piston arrangement. The combination of these two arrangements eliminates binding of the force applying means and moves the primary drive element away from the work area and away from potential contamination. By locating significantly fewer portions of pressure foot 60 in the area where router bit 14 is, there is less damage thereto and a better work area for the operator. The resulting routing machine 10 has less parts, is less expensive and is easier to maintain. The present pressure foot is much simpler and much more accessible.

With the present invention, conventional types of bearing arrangements used heretofore are eliminated and the spring centering devices are also eliminated. Slide member 61 is supported by a plurality of flexure rods 75 which interconnect slide member 61 located at one end of spindle 11 and drive means 80 located at the other end thereof. Rods 75 permit self-centering of slide member 61 without separate centering springs and again function to substantially simplify the mechanism in the area of the work tables.

While the invention has been described with respect to the preferred physical embodiment constructed in accordance therewith, it will be apparent to those skilled in the art that various modifications and improvements may be made without the departing from the scope and spirit of the invention. Accordingly, it is to be understood that the invention is not to be limited by the specific illustrative embodiment, but only by the scope of the appended claims.

I claim:

1. In combination with a machine tool having a spindle means, a cutting tool connected to one end of said spindle means, and worktable means for supporting a workpiece for being cut by said cutting tool, said worktable means and said spindle means being relatively laterally movable for producing a cut in said workpiece along a predetermined line, which cut, upon completion thereof, will produce a cutout part from the portion of said workpiece within said line, said cutting tool exerting a relative lateral force on said workpiece such that when said cutting tool has reached a predetermined point on said line and prior to completion of said cut, said cutting tool will cause lateral motion of said portion of said workpiece relative to said worktable means unless said portion is restrained, a device for selectively restraining said portion of said workpiece comprising:

workpiece engagable means circumscribing said cutting tool and being movable axially relative to said one end of said spindle means for selectively engaging the surface of said portion of said workpiece;

a plurality of elongate flexure members extending around said spindle means, first ends of said flexure members being connected to said workpiece engagable means;

drive means positioned adjacent the other end of said spindle means and being movable axially relative thereto, said drive means being connected to the other ends of said flexure members for moving said workpiece engagable means into contact with said portion of said workpiece, said flexure members transmitting the axial force of said drive means to said workpiece engagable means to force said workpiece against said worktable means for preventing movement thereof relative to said worktable means during completion of said cut, said flexure members being unsupported between said ends thereof and being laterally flexible to support said workpiece engagable means for lateral movement relative to said cutting tool during completion of said cut; and locking means for selectively preventing lateral movement of said workpiece engagable means relative to said cutting tool.

2. A device according to claim 1, wherein said workpiece engagable means comprises:

a disk-shaped slide member positioned generally horizontally adjacent said one end of said spindle means, circumscribing said cutting tool; and a ring shaped friction member supported by said slide member for engaging the surface of said portion of said workpiece.

3. A device according to claim 1, wherein said flexure members comprise:

a plurality of elongate, flexible, noncompressible rods connected between said workpiece engagable means and said drive means.

4. A device according to claim 1 or 3, wherein said drive means comprises:

a single cylinder means and a single piston means mounted coaxially with and above said spindle means.

5. A device according to claim 4, further comprising:

means for rigidly connecting said cylinder means to said spindle means for movement of said cylinder means therewith, said piston means being selectively moveable relative to said cylinder means.

6. A device according to claim 5, wherein said other ends of said flexure members are connected to said piston means.

7. A device according to claim 6, further comprising:

means for biasing said piston means relative to said cylinder means in a direction to maintain said workpiece engagable means out of contact with said portion of said workpiece prior to said completion of said cut.

8. A device according to claim 7, further comprising:

means for conducting fluid pressure to said cylinder means to move said piston means axially, overcoming said biasing means, for moving said workpiece engagable means into contact with said portion of said workpiece.

9. A device according to claim 1 or 3, wherein said locking means comprises:

a ring mounted for rotation about an axis coaxial with the axis of said spindle means, adjacent said one end thereof, the outside diameter of said ring being selected so that the outer surface thereof engages each of said flexure members, in a first position of said ring, to prevent flexure thereof.

10. A device according to claim 9, wherein said outer surface of said ring includes a plurality of decreased diameter sections which are aligned with said flexure members in a second position of said ring, permitting flexure thereof.

11. A device according to claim 10, further comprising:
- means for rotating said ring between said first and second positions.

12. A device according to claim 11, wherein said means for rotating said ring comprises:
- stationary cylinder means; and
- piston means connected between said cylinder means and said ring; and
- means for selectively applying fluid pressure to said cylinder means to drive said piston means.

13. A device according to claim 1, in which said workpiece engagable means is laterally stationary relative to said cutting tool and laterally movable relative to said worktable means prior to completion of said cut and is laterally stationary relative to said worktable means and laterally movable relative to said cutting tool when forcing said workpiece against said worktable means during said completion of said cut.

14. A device according to claim 1, wherein said workpiece engagable means comprises:
- means for engaging the surface of said workpiece when said cutting tool produces said cut in said workpiece, prior to completion of said cut, for forcing said workpiece against said worktable means with a lesser force than that which is exerted during said completion of said cut, whereby said workpiece is held thereby against said worktable means prior to completion of said cut.

* * * * *